United States Patent [19]
Bannon et al.

[11] Patent Number: 5,630,055
[45] Date of Patent: May 13, 1997

[54] AUTONOMOUS PIPELINE RECONFIGURATION FOR CONTINUOUS ERROR CORRECTION FOR FILLS FROM TERTIARY CACHE OR MEMORY

[75] Inventors: Peter J. Bannon, Concord; Ruben W. Castelino, Marlboro, both of Mass.; Chandrasekhara Somanathan, Milpitas, Calif.

[73] Assignee: Digital Equipment Corporation, Maynard, Mass.

[21] Appl. No.: 437,111

[22] Filed: May 5, 1995

[51] Int. Cl.⁶ .......................... H03M 13/00; G06F 11/00
[52] U.S. Cl. ....................... 395/185.05; 371/40.2
[58] Field of Search ........................ 395/185.01, 185.02, 395/185.03, 185.05, 185.06, 185.07, 183.13, 183.18, 182.13, 182.14, 182.15; 371/40.1, 40.2, 30, 48

[56] References Cited

U.S. PATENT DOCUMENTS

| | | | |
|---|---|---|---|
| 4,231,089 | 10/1980 | Lewine et al. | 395/185.02 |
| 4,530,050 | 7/1985 | Fukunaga et al. | 395/185.02 |
| 4,982,402 | 1/1991 | Beaven et al. | 395/182.13 |
| 5,007,056 | 4/1991 | Nakajima | 395/185.01 |
| 5,195,101 | 3/1993 | Guenthner et al. | 395/185.02 |
| 5,220,569 | 6/1993 | Hartness | 395/182.13 |
| 5,297,263 | 3/1994 | Ohtsuka et al. | 395/185.01 |
| 5,361,267 | 11/1994 | Godiwala et al. | 371/40.1 |
| 5,386,549 | 1/1995 | Norrie et al. | 371/40.1 |
| 5,410,554 | 4/1995 | Watanabe | 371/40.1 |
| 5,457,789 | 10/1995 | Dietrich, Jr. et al. | 395/427 |
| 5,490,250 | 2/1996 | Reschke et al. | 371/68.2 |
| 5,504,859 | 4/1996 | Gustafson et al. | 395/182.09 |
| 5,511,164 | 4/1996 | Brunmeier et al. | 395/182.13 |

*Primary Examiner*—Robert W. Beausoliel, Jr.
*Assistant Examiner*—Joseph E. Palys
*Attorney, Agent, or Firm*—Lindsay G. McGuinness; Denis G. Maloney; Arthur W. Fisher

[57] ABSTRACT

A computer system includes a central processing unit which further includes an execution unit and two levels of data cache and an error checking and correcting unit. During error-free operation, external cache fill data is supplied directly to the execution unit while a copy of the data is checked by the error checking and correcting unit. In response to detection of an error by the error checking and correcting unit, the use of the fill data by the execution unit is aborted. Furthermore, the data path for fill data is dynamically reconfigured to force remaining pending fill data to pass through the error checking and correcting unit prior to reaching the execution unit or either of the caches. Once all pending fill data has been processed, the data path is reconfigured back to its error-free mode of operation such that fill data is transmitted directly to the execution unit while a copy of the data is checked by the error checking an correcting unit.

6 Claims, 3 Drawing Sheets

NORMAL (ERROR-FREE) OPERATION

ERROR-MODE OPERATION 5,630,055

AUTONOMOUS PIPELINE RECONFIGURATION FOR CONTINUOUS ERROR CORRECTION FOR FILLS FROM TERTIARY CACHE OR MEMORY

BACKGROUND OF THE INVENTION

This invention relates generally to computer systems and more particularly to computer systems having central processing units (CPUs) employing error correction during cache fill operations.

As is known in the art, computer systems generally include at least one central processing unit and a memory interconnected by a system bus. In a typical computer system implementation, instructions and data are stored in the same memory. The processor fetches instructions from the memory and executes operations on data as specified by the fetched instructions. As the speed of processors has increased, a need has arisen to find ways to more suitably match the access time of the main computer memory to the computational speed of the processor.

One known way of accomplishing this is through the use of cache memory. A cache memory comprises a relatively small, yet relatively fast memory device arranged in close physical proximity to a processor. The utilization of cache memories is based upon the principle of locality. It has been found, for example, that when a processor accesses a location in memory, there is a high probability that the processor will continue to access memory locations surrounding the accessed location for at least a certain period of time. Thus, a preselected data block of a large, relatively slow access time memory, such as a main memory module coupled to the processor via a bus, is fetched from the main memory and stored in the relatively fast access cache memory. Accordingly, as long as the processor continues to access data from the cache memory, the overall speed of operation of the processor is maintained at a level significantly higher than would be possible if the processor had to arbitrate for control of the bus and then perform a memory read or write operation, with the main memory module, for each data access. Since cache memory typically has a much faster access time than main memory, a CPU with a cache memory system spends much less time waiting for instructions and operands to be fetched and/or stored. In multi-processor computer systems, each CPU is typically provided with its own cache or cache system.

A cache memory contains a subset of the information stored in main memory and typically resides on the data path between the processing unit and the system bus. The system bus is used by the CPU to communicate with the main memory as well as other processors in a computer system. When a processor attempts to access a main memory location whose contents (data) have been copied to the cache, no access to main memory is required in order to provide the requested data to the CPU. The required data will be supplied from the cache as long as the data contained in the cache is valid. Since access to the cache is faster than access to main memory the processor can resume operations more quickly.

The high performance capabilities achieved in a RISC computer are further enhanced when a plurality of such RISC computers are arranged in a multiprocessor system utilizing cache memories. A multiprocessor system can comprise, e.g., a plurality of RISC computers, an I/O device and a main memory module or modules, all coupled to one another by a high performance bus. The RISC computers can be utilized to perform co-operative or parallel processing as well as multi-tasking among them for execution of several applications running simultaneously, to thereby achieve dramatically improved processing power. The capabilities of the system can be further enhanced by providing a cache memory at each one of the RISC computers in the system.

While the above described cached, multi-processor RISC computer system represents a state-of-the-art model for a high performance computer system, the art has yet to achieve an optimal level of performance efficiency. For example, bus read transactions may involve errors of various types including, e.g., data parity errors and hard errors. Often read transactions involving errors take longer to complete than error free read transactions. This frequently creates timing problems requiring the bus interface control flow for the error free transfer of data to be different from the control flow for transactions involving errors.

Further timing problems may arise during read type bus transactions if the bus interface, on the module initiating the read transaction, was to check the validity of the data involved in every data transfer. In such a case, there may not be sufficient time for the bus interface to complete the data transfer in time to be ready for a subsequent bus data transfer.

Known approaches used to solve the above timing problems include slowing down the next bus transfer following every processor initiated read type transaction, i.e. increase the amount of time before the bus interface must respond to the subsequent bus transaction by delaying the subsequent transaction. Such an approach requires that the bus protocol provide a mechanism to slow down the rate of bus transfers and results in a waste of bus bandwidth.

Another known approach has been to use software to control the error handling during read transactions. In such a scheme, the control flow logic of the bus interface need not handle read transactions involving errors any differently than transactions which do not involve errors since the error handling is done by the software and not the control flow logic. However, the use of software for error handling has several disadvantages, including the fact that it is relatively slow in detecting and responding to errors. Thus, when software is used for error handling, a substantial period of time may pass before an error is detected. During that time, in which the error goes undetected, performance of the computer system may become unpredictable as a result of the error's presence in the computer system. In a cached multiprocessor computer system, this may result in the loss of coherency throughout the computer system.

Yet another known approach is to have data which is returned from external memory or the backup cache flow through error checker/corrector logic en route to the execution unit as well as the primary and secondary caches. However this approach adds additional CPU cycles to the latency of the external fill procedure.

SUMMARY OF THE INVENTION

In accordance with one aspect of the present invention, a computer system includes a central processing unit (CPU) which includes among other things, a plurality of cache memories and an execution unit connected to a computer bus. The CPU also includes an error checker/corrector connected to the computer bus for identifying and correcting errors in data received by the execution unit over the computer bus. Also included in the computer system is a means for transferring data received by the CPU to the execution unit prior to transmitting the data to the error checker. Additionally, means responsive to the error checker are provided for aborting the use of the data by the execution unit when an error is detected by the error checker. The computer system further includes means for transferring the data to the cache memories after the data has been evaluated by the error checker to be error free. With such an arrangement, a computer system can operate in a very efficient manner during error-free operation and is able to dynamically reconfigure the data path for fill data in the event of an error. The system avoids bus resource collisions and processor stalls by routing all pending fill data through the reconfigured data path before reverting back to the error-free operation data path.

In accordance with a further aspect of the present invention, a method of operating a computer system having a central processing unit including an execution unit coupled to a plurality of cache memories via a computer bus includes the steps of transmitting a first portion of pending fill data associated with the cache memories to the execution unit. The execution unit then initiates processing of the first portion pending fill data. After the transmitting step, a copy of the first portion of fill data is routed to an error checking/correcting (ECC) unit. After receipt by the ECC unit, the copy of the fill data is checked for errors. If an error is detected in the copy of the first portion of fill data the use of the first portion of fill data is aborted by the execution unit. The first portion of fill data is then corrected by the ECC unit and forwarded to the execution unit. All remaining pending fill data is then forced through the ECC unit prior to transmission to the execution unit. With such an arrangement, a computer system can operate in a very efficient manner during error-free operation and is able to dynamically reconfigure the data path for fill data in the event of an error. The system avoids bus resource collisions and processor stalls by routing all pending fill data through the reconfigured data path before reverting back to the error-free operation data path

BRIEF DESCRIPTION OF THE DRAWINGS

The above-mentioned and other features of the invention will now become more apparent by reference to the following description taken in connection with the accompanying drawings in which:

FIG. 3a is a timing diagram associated with the data path for error-free mode operation of FIG. 2a.

DETAILED DESCRIPTION OF THE PREFERRED EMBODIMENT

Figure 1:
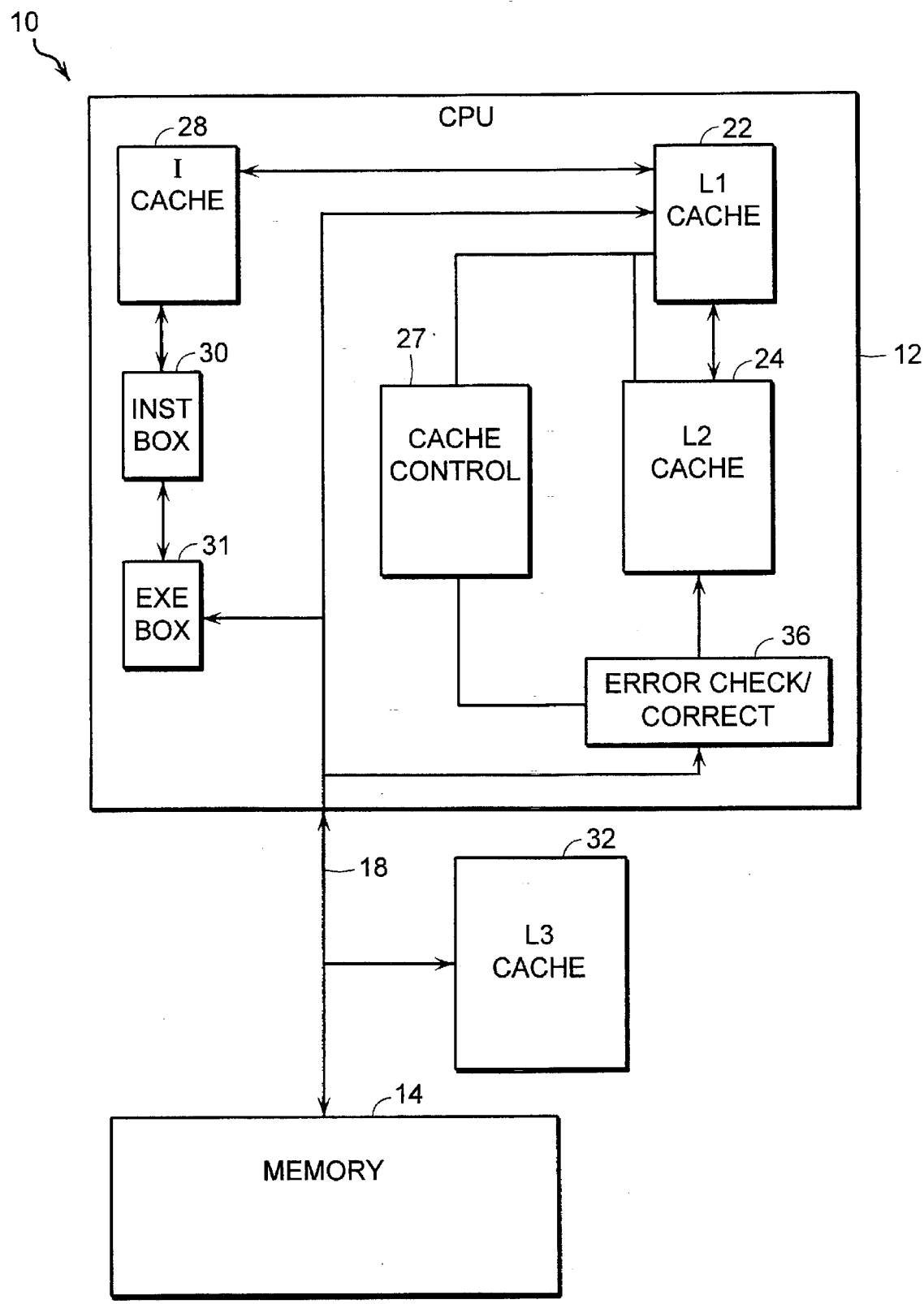
FIG. 1 is a is detailed block diagram of one central processing unit, including an associated cache memory system, of a multiprocessor computer system.

Referring now to FIG. 1, computer system 10 is shown to include, inter alia, central processing unit (CPU) 12, cache 32 and memory 14 all interconnected by bus 18. CPU 12 further includes instruction unit 30 and execution unit 31. CPU 12 is illustrative of what may be one of several CPUs making up computer system 10. During normal operation, instructions are typically fetched from memory 14 or instruction cache 28 and transmitted to instruction unit 30. The instructions are processed by instruction unit 30 and are used to direct the manner in which execution unit 31 will manipulate data.

Typical operation of computer system 10 includes the processing of a compiled computer program which has been loaded into memory 14. As part of the processing, data and instructions are read from memory and furnished to the instruction unit 30 and execution unit 31. In order to increase the speed at which computer system 10 processes data and instructions, data caches 22 and 24 are included in CPU 12 to provide temporary storage for frequently used data. Caches 22 and 24 are typically much smaller and faster memory structures than main memory 14 or data cache 32. By providing data caches 22 and 24 within the CPU 12, faster access to the stored data is achieved.

Cache 22 may be a so called write-though type cache while cache 24 may be a so called write-back type cache. Additionally, if data cache 32 is provided, it may be located off the CPU 12. The three caches may be arranged in a hierarchical fashion with each lower level (larger,slower) cache containing at least a copy of all data residing in the corresponding higher level cache. For example, data cache 24 would contain a subset of the data contained in data cache 32 and data cache 32 would contain a copy of all the data stored in data cache 24.

As stated above, normal operation of computer system 10 includes the fetching of data and instructions from memory 14 and caches 22, 24, and 32. As part of the procedure for maintaining cache coherency in computer system 10, data is often retrieved from main memory 14 and placed into the data cache 24. This data is typically fetched in response to a miss during a look up in cache 24. The returned data is often referred to as "fill dat".

During the transfer of fill data from the memory 14 to the data cache 24 and execution unit 31, errors may be introduced into the data which cause the data to become invalid for processing. For this reason, error checking and correction (ECC) unit 36 is provided to check and correct any errors in the fill data. ECC 36 operates under the control of cache controller 27 and according to the preferred embodiment is furnished as part of CPU 12.

Figure 2A:
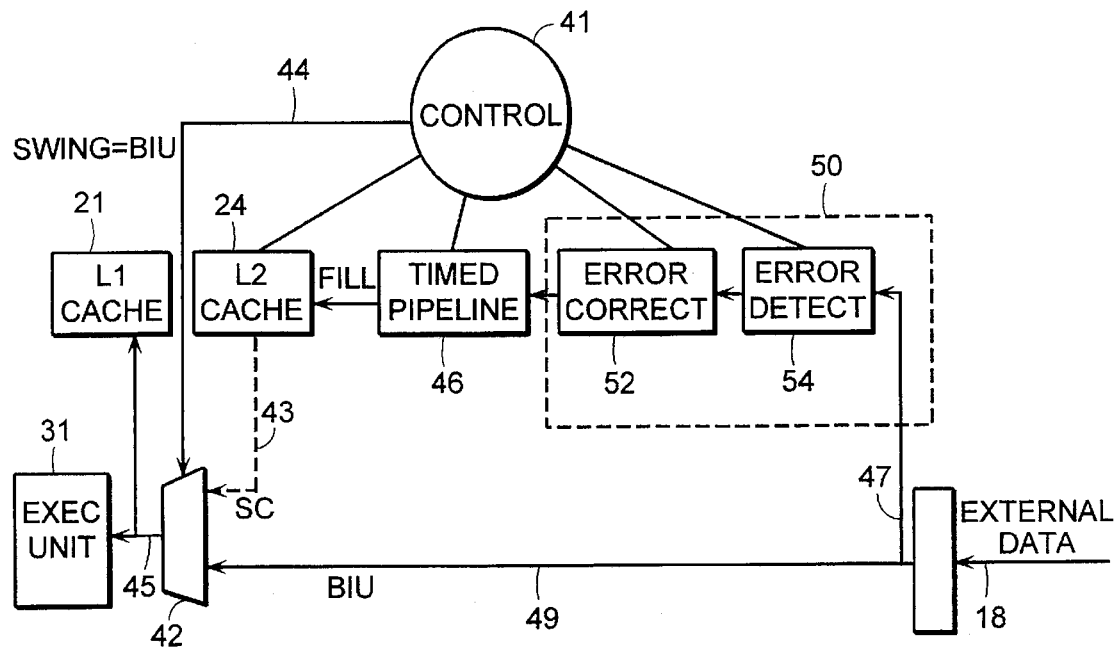
FIG. 2a is a diagrammatic representation of the data path associated with an error-free mode operation of the central processing unit of FIG. 1.
Figure 2B:
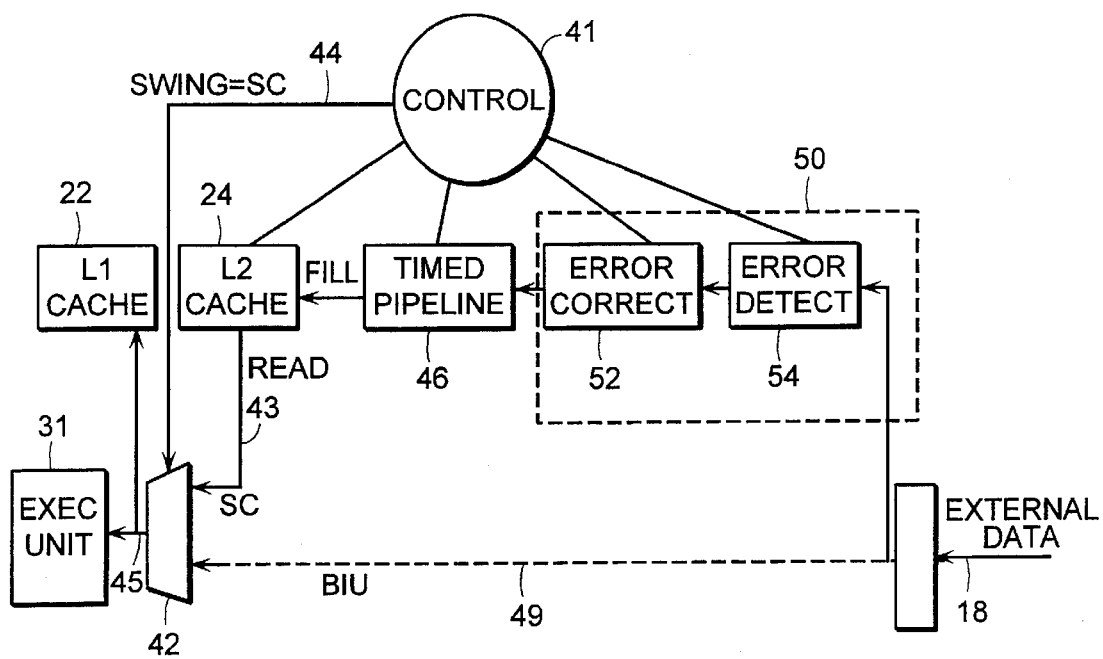
FIG. 2b is a diagrammatic representation of the data path associated with an error mode operation of the central processing unit of FIG. 1.

Referring now to FIGS. 2a and 2b data paths for fill operations associated with CPU 12 during error-free operation and error-mode operation respectively, are shown to include error checking/correcting (ECC) logic 50 which further includes error detection logic 52 and error correction logic 54. Timing logic 46 is provided to synchronize data flow into L2 cache 24. Also included is control logic 41. Generally, external fill data arrives at CPU 12 via system bus 18 and traverses one of the two paths depicted in FIGS. 2a and 2b. The data path taken depends on the current mode of operation, i.e., error-free mode or error mode.

During normal (error-free) operation, external fill data will be transmitted (as shown by the solid bus lines 49, and 45) to the execution unit 31 and the L1 cache 22 via a data path which includes bus 49, multiplexor 42, and bus 45. While the data is being transmitted to the execution unit, a copy is transmitted to ECC logic 50 as shown by solid bus line 47. Error detection unit 54 examines the fill data to determine if there are any errors such as parity errors. If no errors are detected, the data passes through error correction logic 52 and timing logic 46 to the its ultimate destination which is the L2 cache 24.

Additionally, the timing of data transfer to the L1 cache 22 is such that, although it bypasses the ECC logic 50, no fill data is supplied to the L1 cache until a copy of the data has been checked and determined to be error free. The reason for this is to prevent the writing of bad data to the L1 cache in the event of a detected error. As will be described below, when an error is detected in the fill data, the use of the data by the execution unit is aborted, and the data is not written to the L1 cache until it has been corrected.

The examination of data by ECC 50 and passage to L2 cache 24 is managed by control logic 41. During error-free operation, the control logic transmits a signal to the multiplexor 42 allowing fill data to pass from bus 49 to bus 45 and to the execution unit 31. As stated above, the timing of data transmission is such that the updating of the L1 cache is performed only after the copy of the fill data has successfully passed through ECC logic 50. Additionally, during error-free operation, bus line 43 which connects the L2 cache 24 with multiplexor 42 is deactivated as indicated by the dashed lines.

Upon detection of an error by error detection logic 54, control logic 41 dynamically causes the data path to be reconfigured to that as shown by the solid lines in FIG. 2b. In particular, a signal is asserted on signal line 44 which causes multiplexor 42 to select as its input, data bus 43 and prevents any further fill data from reaching execution unit 31 via bus 49. Furthermore, the use of the error laden fill data by the execution unit is aborted. The copy of the fill data is corrected by error correction logic 52 and transmitted to the L2 cache. After the data has filled the L2 cache, it is then furnished (via now activated bus 43) to the execution unit 31. It can be seen then that a new data path is established which includes the fill data passing through the ECC logic 50 prior to reaching the execution unit 31 or either of the caches 22 and 24.

All remaining pending fill data is then routed through ECC 50 and timing logic 46 to the L2 cache 24. Signal line 44 remains asserted and bus 43 remains activated and provide the new path to execution unit 31. The reconfigured data path is operational until all pending fill data has been processed. If the data path were to be reconfigured back to normal (error-free) operation before all pending fill data had been processed, it could result in bus resource collisions. Also, other fill data may have errors which need to be processed while operating in error-mode. Furthermore, since the fill data arrives at fixed time intervals, switching back to error-free operation mid-stream may lead to a collision in the fill pipeline.

Figure 3A:
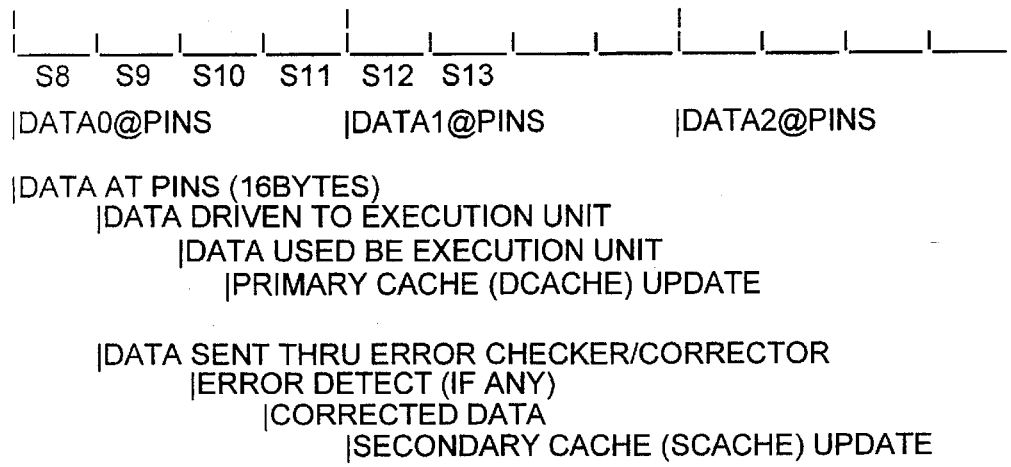
Figure 3B:
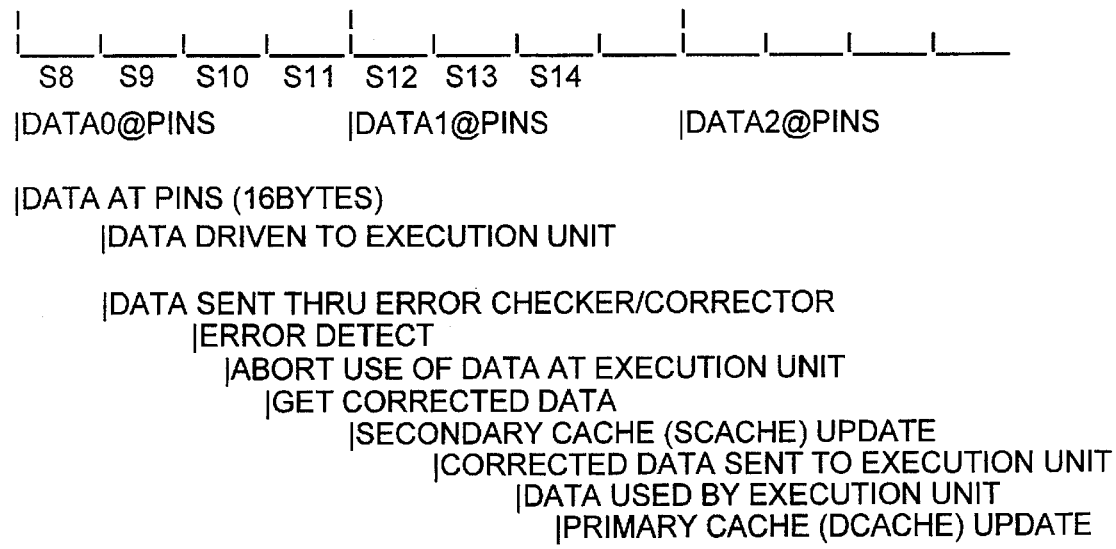
FIG. 3b is a timing diagram associated with the data path for error-mode operation of FIG. 2b.

Referring now to FIGS. 3a and 3b, timing diagrams associated with the data paths of FIGS. 2a and 2b respectively are shown. Operation of computer system 10 can be thought of as a pipeline which can broken down into the various stages or times at which different operations occur. Here, only stages 8 and following are of interest to the discussion.

As indicated in FIG. 3a which represents a timing diagram for error-free operation, the first packet of external fill data (data1) arrives at CPU 12 during stage 8. During stage 9, the fill data is transmitted or driven to the execution unit 31 (FIG. 2a). Also during stage 9, the a copy of the fill data is transmitted to the ECC logic 50 (FIG. 2a). At stage 10, the fill data will be used by the execution unit while the copy of the fill data is being checked for errors by the ECC logic. The L1 cache 22 (FIG. 2a) is also updated during stage 10 of the pipeline but only if there has been no error detected by ECC logic 50 (FIG. 2a). The L2 cache 24 (FIG. 2a) is updated with the fill data during stage 12. As will be described below, any detection of erroneous data would occur in stage 10 and the corrected data would be made available during stage 11. Note that during stage 12 while data1 is being written to the L2 cache, the next packet of fill data (data2) is arriving at the CPU for processing. Stage 12 therefore corresponds in an operational manner to stage 8. Similarly, subsequent stage 16 would correspond operationally to stage 12. This relationship would hold until all pending fill data was processed or an error was detected by the ECC logic.

If an error is detected in stage 10, the data path would be dynamically reconfigured to that shown in FIG. 2b and follow the timing diagram of FIG. 3b. That is, as described above, control logic 41 (FIG. 2b) dynamically causes the data path to reconfigure such that data on bus 49 is prevented from reaching execution unit 31. Additionally, an error detected in stage 10 would also cause (during stage 10) the execution unit to abort its use of the erroneous data. During stage 11, the data would be corrected by correction logic 52 and then be transmitted to the L2 cache 24 (FIG. 2b) during stage 12. During stage 13, the corrected data is furnished to the execution unit (from the L2 cache) via bus 43 through multiplexor 42 (FIG. 2b) as activated by the control logic 41. After receiving the corrected data in stage 13, the execution unit uses the data and the L1 cache is updated in stage 14. Since the use of the erroneous data was aborted in stage 10, the L1 cache never received the faulty data.

Like the timing diagram for error-free operation, the second packet of pending fill data arrives at the CPU while the first packet is being processed. As such, stage 12 of the timing diagram corresponds operationally to stage 8. Note that in stage 9 data seems to be driven to the execution unit as in error-free operation. However, since the control logic has deactivated the data bus 49 by way of multiplexor 42, the uncorrected driven data never actually reaches the execution unit. Only data that has been through ECC logic 50 reaches the execution unit (as indicated in stages 13 and 14).

For the reasons described above, this mode of operation is continued until all pending fill data is processed to the execution unit. By operating the computer system as described above, latency for error-free fill operations is reduced. Additionally, the L1 and L2 caches are only updated once the data has been processed by the ECC logic. Thus each fill data is written to the caches only once.

Having described a preferred embodiment of the invention, it will now become apparent, to one of skill in the art that other embodiments incorporating its concepts may be used. It is felt therefore, that this invention should not be limited to the disclosed embodiment, but rather should be limited only by the spirit and scope of the appended claims.

What is claimed is:

1. A computer system comprising:

a central processing unit (CPU) including a plurality of cache memories and an execution unit coupled to a computer bus;

error checking means coupled to said computer bus for identifying errors in data received by said execution unit over said computer bus;

means for transferring said data to said execution unit prior to transmitting said data to said error checking means;

means responsive to said error checking means for aborting use of said data by said execution unit, and for forcing subsequently received data to be transferred directly to said error checking means, when an error in said data is detected; and error correcting means for correcting any errors associated with said data;

means for transferring said data to said cache memories only after said data has been evaluated to be error free by said error checking means or has been corrected by said error correcting means.

2. The computer system of claim 1 wherein said aborting means further includes means for ensuring that any pending data to be processed by said execution unit is first transmitted to said error checking means and error correcting means prior to being sent to said execution unit.

3. The computer system of claim 2 wherein said aborting means further includes means for reestablishing a data path, after said pending data has been processed, such that new data is sent to directly to said execution unit.

4. The computer system of claim 1 wherein said error checking unit is an error checking/correcting (ECC) unit for detecting and correcting faulty data.

5. A method of operating a computer system having a central processing unit including an execution unit coupled to a plurality of cache memories via a computer bus, said method comprising the steps of:

a) transmitting a first portion of pending fill data associated with said cache memories to said execution unit;

b) initiating processing of said first portion of fill data by said execution unit;

c) after said transmitting step, routing said first portion of fill data to an error checking/correcting (ECC) unit;

d) checking, by said ECC unit, said first portion of said fill data for errors; and e) upon detection of an error in said first portion of said fill data, aborting said processing of said first portion of said fill data, correcting said first portion of said fill data, and forcing remaining pending fill data to be routed to said ECC unit prior to transmission to said execution unit.

6. The method of claim 5 further comprising the step of:

after said pending fill data has been processed, reestablishing a data path wherein new fill data, transmitted after all of said pending fill data has been processed, is first sent to said execution unit as in steps a) through d).

* * * * *